United States Patent
Nakashio et al.

(10) Patent No.: US 11,355,145 B2
(45) Date of Patent: Jun. 7, 2022

(54) MAGNETIC RECORDING MEDIUM

(71) Applicant: Sony Corporation, Tokyo (JP)

(72) Inventors: Eiji Nakashio, Miyagi (JP); Masaru Terakawa, Miyagi (JP); Yoichi Kanemaki, Miyagi (JP); Tomoe Sato, Miyagi (JP); Katsunori Maeshima, Miyagi (JP); Nobuyuki Sasaki, Miyagi (JP)

(73) Assignee: Sony Corporation, Tokyo (JP)

(*) Notice: Subject to any disclaimer, the term of this patent is extended or adjusted under 35 U.S.C. 154(b) by 862 days.

(21) Appl. No.: 16/070,140

(22) PCT Filed: Dec. 14, 2016

(86) PCT No.: PCT/JP2016/005121
§ 371 (c)(1),
(2) Date: Jul. 13, 2018

(87) PCT Pub. No.: WO2017/125981
PCT Pub. Date: Jul. 27, 2017

(65) Prior Publication Data
US 2019/0013043 A1 Jan. 10, 2019

(30) Foreign Application Priority Data
Jan. 20, 2016 (JP) .............................. JP2016-008768

(51) Int. Cl.
*G11B 5/65* (2006.01)
*G11B 5/706* (2006.01)
*G11B 5/714* (2006.01)

(52) U.S. Cl.
CPC ............. *G11B 5/653* (2013.01); *G11B 5/656* (2013.01); *G11B 5/706* (2013.01); *G11B 5/714* (2013.01)

(58) Field of Classification Search
CPC ......... G11B 5/653; G11B 5/656; G11B 5/706; G11B 5/714; G11B 5/78
See application file for complete search history.

(56) References Cited

U.S. PATENT DOCUMENTS

2009/0174969 A1    7/2009   Tada et al.
2011/0299198 A1    12/2011  Tada et al.

FOREIGN PATENT DOCUMENTS

| JP | H05-314457 A | 11/1993 |
| JP | 2005159065 A | 6/2005 |
| JP | 3862088 | 10/2006 |
| JP | 2007-294084 A | 11/2007 |
| JP | 2008-243317 A | 10/2008 |
| JP | 2014514231 A | 6/2014 |
| WO | 2015/198514 A1 | 12/2015 |

OTHER PUBLICATIONS

Cherubini, et al., 29.5-Gb/in2 Recording Areal Density on Barium Ferrite Tape, IEEE Transactions On Magnetics, vol. 47, No. 1, Jan. 2011.
International Search Report and Written Opinion issued in connection with International Patent Application No. PCT/JP2016/005121, dated Feb. 28, 2017. (8 pages).

*Primary Examiner* — Holly Rickman
(74) *Attorney, Agent, or Firm* — K&L Gates LLP

(57) ABSTRACT

The magnetic recording medium includes a long substrate body, and a magnetic layer including a powder of cubic crystal ferrite magnetic particles. The sum of a squareness ratio in the longitudinal direction and a squareness ratio in the vertical direction is 1.2 or more, and the difference of the squareness ratio in the longitudinal direction and the squareness ratio in the vertical direction is 0.15 or more.

8 Claims, 3 Drawing Sheets

MAGNETIC RECORDING MEDIUM

CROSS-REFERENCE TO RELATED APPLICATIONS

The present application claims the benefit of International Application No. PCT/JP2016/005121, filed Dec. 14, 2016, which claims priority to Japanese Application No. 2016-008768, filed Jan. 20, 2016, the disclosures of which are incorporated herein by reference.

BACKGROUND

The present technology relates to a magnetic recording medium.

A magnetic recording medium having a configuration having a nonmagnetic layer and a magnetic layer laminated on a long substrate is known. As the magnetic powder contained in the magnetic layer, needle shape magnetic powders such as ferromagnetic iron oxide, Co-modified ferromagnetic iron oxide, $CrO_2$ and ferromagnetic alloy are widely used. The needle shape magnetic powders are magnetized in the longitudinal direction thereof during the formation of the magnetic layer.

In a magnetic recording medium using a needle shape magnetic powder, in order to attain a high recording density, ultrashort wavelength recording (conversion of a recording wavelength to an ultrashort wavelength) is necessary. However, when the longitudinal axis of the needle shape magnetic powder is shortened so as to attain ultrashort wavelength recording, the coercive force of the needle shape magnetic powder is decreased. This is because the expression of the coercive force of the needle shape magnetic powder is due to its shape, i.e., a needle shape. Furthermore, when short wavelength recording is conducted, it is possible that self-demagnetization increases and a sufficient output cannot be obtained.

Therefore, in recent magnetic recording media corresponding to LTO6 (LTO: abbreviation of Linear Tape Open), a hexagonal crystal barium ferrite magnetic powder is used instead of a needle shape magnetic powder. A roadmap for high density recording for transferring to a vertical recording system of a barium ferrite magnetic powder from a longitudinal recording system of a needle shape magnetic powder in the future has been drawn (for example, see Non-Patent Document 1). As the magnetic powders for attaining high density recording, besides the above-mentioned barium ferrite magnetic powder, spinel type ferrimagnetic powders containing Co, Ni and other bivalent metals have been reported (for example, see Patent Document 1).

SUMMARY

Problems to be Solved by the Invention

The object of the present technology is to provide a magnetic recording medium having a high SNR (Signal-Noise Ratio).

Solutions to Problems

In order to solve the above issue, the present technology is a magnetic recording medium including: a long substrate body; and a magnetic layer including a powder of cubic crystal ferrite magnetic particles, in which a sum of a squareness ratio in a longitudinal direction and a squareness ratio in a vertical direction is 1.2 or more, and a difference of the squareness ratio in the longitudinal direction and the squareness ratio in the vertical direction is 0.15 or more.

Effects of the Invention

As explained above, according to the present technology, a magnetic recording medium having a high SNR can be provided.

DETAILED DESCRIPTION

The exemplary embodiment of the present technology will be explained in the following order.
1 Configuration of magnetic recording medium
2 Method for producing magnetic recording medium
3 Effect

First Exemplary Embodiment

1 Configuration of Magnetic Recording Medium

Figure 1:
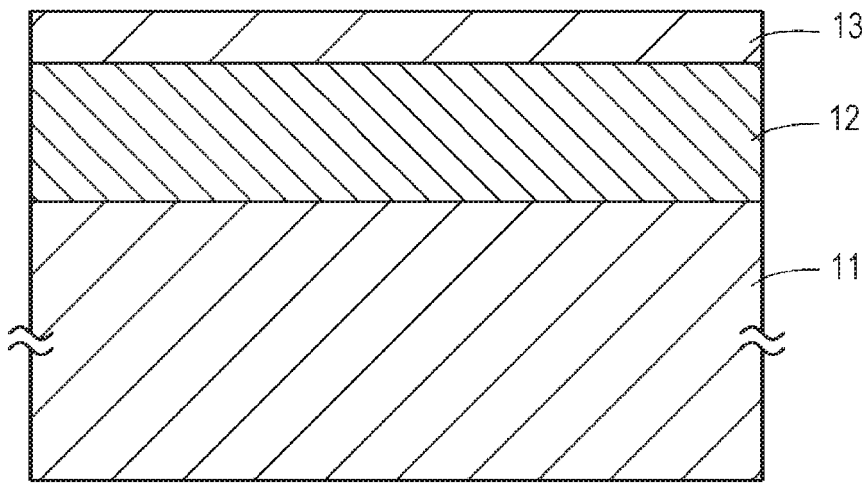
FIG. 1 is a schematic cross-sectional view showing an example of a configuration of the magnetic recording medium of an embodiment of the present technology.

The magnetic recording medium of an embodiment of the present technology is a so-called vertical magnetic recording medium, and as shown in FIG. 1, the magnetic recording medium includes a long substrate body 11, a primer layer 12 disposed on one main surface of the substrate body 11, and a magnetic layer 13 disposed on the primer layer 12. Where necessary, the magnetic recording medium may further include a protective layer, a lubricant layer, and the like disposed on the magnetic layer 13. Furthermore, where necessary, the magnetic recording medium may further include a back coat layer disposed on other main surface of the substrate body 11.

The sum of the squareness ratio in the longitudinal direction and the squareness ratio in the vertical direction is 1.2 or more, and the difference of the squareness ratio in the longitudinal direction and the squareness ratio in the vertical direction is 0.15 or more. Preferably, the sum of the squareness ratio in the longitudinal direction and the squareness ratio in the vertical direction is 1.28 or more, and the difference of the squareness ratio in the longitudinal direction and the squareness ratio in the vertical direction is 0.26 or more. However, "the difference of the squareness ratio in the longitudinal direction and the squareness ratio in the vertical direction" means a difference obtained by subtracting "the squareness ratio in the vertical direction" from "the squareness ratio in the longitudinal direction". When the sum of the squareness ratios is lower than 1.2, the noise tends to increase and the output tends to decrease. Therefore, the SNR tends to deteriorate. When the difference of the squareness ratios is lower than 0.15, the noise tends to increase and the output tends to decrease as in the case where the sum of the squareness ratios is lower than 1.2. That is, the SNR tends to deteriorate. The upper limit value of the sum of the squareness ratio in the longitudinal direction and the squareness ratio in the vertical direction is, for example, 1.36 or less. The upper limit value of the difference of the squareness ratio in the longitudinal direction and the squareness ratio in the vertical direction is, for example, 0.29 or less.

(Substrate Body)

The substrate body 11 is a flexible long film. As examples of the material for the substrate body 11, polyesters such as polyethylene terephthalate, polyolefins such as polyethylene and polypropylene, cellulose derivatives such as cellulose triacetate, cellulose diacetate and cellulose butyrate, vinyl-based resins such as polyvinyl chloride and polyvinylidene chloride, plastics such as polycarbonate, polyimide and polyamideimide, light metals such as aluminum alloy and titanium alloy, ceramics such as alumina glass, and the like can be used. In order to enhance the mechanical strength of the magnetic recording medium, a thin film containing an oxide of Al or Cu and the like may be disposed on at least one main surface of the substrate body 11.

(Magnetic Layer)

The magnetic layer 13 is a vertical recording layer capable of short wavelength recording or ultrashort wavelength ultrarecording. The magnetic layer 13 contains a magnetic powder and a binder. Where necessary, the magnetic layer 13 may further contain at least one kind of additives from electroconductive particles, a lubricant, a polisher, a hardener, an anticorrosive, and the like.

The magnetic powder is a powder of cubic crystal ferrite magnetic particles (hereinafter referred to as "cubic crystal ferrite magnetic powder"). By using a cubic crystal ferrite magnetic powder as the magnetic powder, a higher coercive force Hc than that in a case where a hexagonal crystal barium ferrite magnetic powder or the like is used as the magnetic powder can be obtained. The cubic crystal ferrite magnetic powder is oriented in the longitudinal direction of the substrate body 11. By being oriented in the longitudinal direction, the sum of the squareness ratios can be 1.2 or more, and the difference of the squareness ratios can be 0.15 or more.

The cubic crystal ferrite magnetic particles are spinel ferrimagnetic particles. The cubic crystal ferrite magnetic particles are particles of an iron oxide containing a cubic crystal ferrite as a main phase. The cubic crystal ferrite preferably contains one or more kind selected from the group consisting of Co, Ni, Mn, Al, Cu and Zn. More preferably, the cubic crystal ferrite contains at least Co, and further contains one or more kind selected from the group consisting of Ni, Mn, Al, Cu and Zn besides Co. More specifically, the cubic crystal ferrite has an average composition represented by the general formula $MFe_2O_4$. However, M is preferably one or more kind of metal(s) selected from the group consisting of Co, Ni, Mn, Al, Cu and Zn. M is more preferably a combination of Co and one or more kind of metal(s) selected from the group consisting of Ni, Mn, Al, Cu and Zn.

The cubic crystal ferrite magnetic particles each have a cubic shape or an approximately cubic shape. The "cubic crystal ferrite magnetic particles each have an approximately cubic shape" herein refers to that the cubic crystal ferrite magnetic particles have rectangular shapes having an average plate shape ratio (average aspect ratio (average plate diameter $L_{AM}$/average plate thickness $L_{BM}$)) of 0.75 or more and 1.25 or less. Since the cubic crystal ferrite magnetic particles have small unit grid sizes, they are advantageous in view of formation of ultramicroparticles in the future.

The average plate diameter (average particle size) of the cubic crystal ferrite magnetic particles is preferably 14 nm or less, and more preferably 10 nm or more and 14 nm or less. When the average plate diameter is 14 nm or less, the exposed surface area of the particles on the surface of the medium can be decreased, and thus the SNR can further be improved. On the other hand, when the average plate diameter is 10 nm or more, the cubic crystal ferrite magnetic powder is easily prepared.

The average plate diameter of the cubic crystal ferrite magnetic particles is obtained as follows. Firstly, the surface of the magnetic layer 13 is observed by an atomic force microscope (AFM), and a length $L_A$ of one side of a square shaped surface of several hundreds of cubic crystal ferrite magnetic particles contained in the AFM image is obtained as a plate diameter. Secondly, the plate diameters of the several hundreds of cubic crystal ferrite magnetic particles are simply averaged (arithmetically averaged) to obtain an average plate diameter $L_{AM}$.

The average plate shape ratio (average aspect ratio (average plate diameter $L_{AM}$/average plate thickness $L_{BM}$)) of the cubic crystal ferrite magnetic particles is preferably 0.75 or more and 1.25 or less. When the average plate shape ratio is within this numerical range, the cubic crystal ferrite magnetic particles each have a cubic shape or an approximately cubic shape, and thus the aggregation of the magnetic powder can be suppressed.

Here, the average plate shape ratio of the cubic crystal ferrite magnetic particles is obtained as follows. Firstly, the average plate diameter $L_{AM}$ of the cubic crystal ferrite magnetic particles is obtained as above. Secondly, a cross-sectional surface of the magnetic layer 13 is observed by a transmission electron microscope (TEM), and the width $L_B$ of the side surface of the several hundreds of cubic crystal ferrite magnetic particles contained in that TEM image, i.e., the length $L_B$ of the side of the square surface that constitutes the side surface, is obtained as a plate thickness. Then, the plate thicknesses $L_B$ of the several hundreds of cubic crystal ferrite magnetic particles are simply averaged (arithmetically averaged) to obtain an average plate thickness $L_{BM}$. Then, using the average plate diameter $L_{AM}$ and the average plate thickness $L_{BM}$ obtained as above, an average plate shape ratio (average plate diameter Lm/average plate thickness $L_{BM}$) is obtained.

As the binder, a resin having a structure obtained by adding a crosslinking reaction to a polyurethane-based resin, a vinyl chloride-based resin or the like is preferable. However, the binder is not limited to this, and other resins may be suitably incorporated according to the physical properties and the like required for the magnetic recording medium. Generally, the resin to be incorporated is not specifically limited as long as it is a resin that is generally used in an application type magnetic recording medium.

Examples include vinyl chloride, vinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, vinyl chloride-acrylonitrile copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-alrylonitrile copolymers, acrylonitrile-butadiene copolymers, polyamide resins, polyvinyl butyrals, cellulose derivatives (cellulose acetate butyrate, cellulose diacetate, cellulose triacetate, cellulose propionate, nitrocellulose), styrene butadiene copolymers, polyester resins, amino resins, synthetic rubbers and the like.

Furthermore, examples of the thermosetting resin or reacting resin include phenol resins, epoxy resins, urea resins, melamine resins, alkyd resins, silicone resins, polyamine resins, urea-formaldehyde resins and the like.

Furthermore, polar functional groups such as $-SO_3M$, $-OSO_3M$, $-COOM$, $P=O(OM)_2$ and the like may be introduced in the above-mentioned respective binders for the purpose of improving the dispersibility of the magnetic powder. Here, M in the formula is a hydrogen atom, or an alkali metal such as lithium, potassium or sodium.

Furthermore, the polar functional groups include side chain type polar functional groups having a terminal group such as $-NR1R2$ or $-NR1R2R3+X-$, and main chain type polar functional groups having $>NR1R2+X-$. Here, in the formulas, each of R1, R2, R3 is a hydrogen atom or a hydrocarbon group, and $X-$ is a halogen element ion of fluorine, chlorine, bromine, iodine or the like, or an inorganic or organic ion. Furthermore, the polar functional groups also include $-OH$, $-SH$, $-CN$, an epoxy group and the like.

The magnetic layer 13 may further contain, as nonmagnetic reinforcing particles, aluminum oxide ($\alpha$, $\beta$ or $\gamma$-alumina), chromium oxide, silicon oxide, diamond, garnet, emery, boron nitride, titanium carbide, silicon carbide, titanium carbide, titanium oxide (rutile type or anatase type titanium oxide) and the like.

(Primer Layer)

The primer layer 12 is a nonmagnetic layer containing a nonmagnetic powder and a binder as major components. Where necessary, the primer layer 12 may further contain at least one kind of additives from electroconductive particles, a lubricant, a hardener and an anticorrosive, and the like.

The nonmagnetic powder may be either an inorganic substance or an organic substance. Furthermore, the nonmagnetic powder may be carbon black or the like. Examples of the inorganic substance include metals, metal oxides, metal carbonates, metal sulfates, metal nitrides, metal carbides, metal sulfides and the like. Examples of the nonmagnetic powder include, but are not limited to, various shapes such as a needle shape, a spherical shape, a cubic shape and a plate shape. The binder is similar to those for the above-mentioned magnetic layer 13.

2 Method for Producing Magnetic Recording Medium

Then, an example of the method for producing a magnetic recording medium having the above-mentioned configuration will be explained. Firstly, a nonmagnetic powder and a binder and the like are kneaded and dispersed in a solvent to prepare a coating for forming a primer layer. Secondly, a magnetic powder and a binder and the like are kneaded and dispersed in a solvent to prepare a coating for forming a magnetic layer. At this time, the dispersion time and the like are adjusted so that the magnetic powder is sufficiently dispersed. When the dispersion is insufficient, it is possible that the sum of the squareness ratio in the longitudinal direction and the squareness ratio in the vertical direction becomes 1.2 or more, and the difference of the squareness ratio in the longitudinal direction and the squareness ratio in the vertical direction does not become 0.15 or more, even the magnetic powder is subjected to electric field orientation in the subsequent step. For the preparation of the coating for forming a magnetic layer and the coating for forming a primer layer, for example, the following solvents, dispersion apparatuses and kneading apparatuses can be used.

Examples of the solvents used for the preparation of the above-mentioned coatings include ketone-based solvents such as acetone, methyl ethyl ketone, methyl isobutyl ketone and cyclohexanone; alcohol-based solvents such as methanol, ethanol and propanol; ester-based solvents such as methyl acetate, ethyl acetate, butyl acetate, propyl acetate, ethyl lactate and ethylene glycol acetate; ether-based solvents such as diethylene glycol dimethyl ether, 2-ethoxyethanol, tetrahydrofuran and dioxane; aromatic hydrocarbon-based solvents such as benzene, toluene and xylene; halogenated hydrocarbon-based solvents such as methylene chloride, ethylene chloride, carbon tetrachloride, chloroform and chlorobenzene; and the like. These may be used alone, or may be used by suitably mixing.

As the kneading apparatus used for the preparation of the above-mentioned coatings, for example, kneading apparatuses such as a continuous biaxial kneader, a continuous biaxial kneader capable of diluting in multiple steps, a kneader, a pressurizing kneader and a roll kneader can be used, but the kneading apparatus is not specifically limited to these apparatuses. Furthermore, as the dispersion apparatus used for the preparation of above-mentioned coating, for example, dispersion apparatuses such as a roll mill, a ball mill, a horizontal sand mill, a longitudinal sand mill, a spike mill, a pin mill, a tower mill, a pearl mill (for example, "DCP Mill" manufactured by Eirich, and the like), a homogenizer and an ultrasonic disperser can be used, but the dispersion apparatus is not specifically limited to these apparatuses.

Then, the coating for forming a primer layer is applied on the main surface of one surface of the substrate body 11 and dried to form a primer layer 12. Then, the coating for forming a magnetic layer is applied and dried on this primer layer 12 to form a magnetic layer 13 on the primer layer 12. Note that during the drying, the cubic crystal ferrite magnetic powder contained in the magnetic powder is subjected to electric field orientation in the longitudinal direction of the substrate body 11 by using, for example, a solenoid coil. Then, where necessary, protective layer and a lubricant layer may be formed on the magnetic layer 13, and a back coat layer may be formed on the other main surface of the substrate body 11.

Then, the substrate body 11 on which the primer layer 12 and the magnetic layer 13 have been formed is wound around a large diameter core again, and a curing treatment is conducted. Then, the substrate body 11 on which the primer layer 12 and the magnetic layer 13 have been formed is subjected to a calender processing, and cut into a predetermined width. By this way, a pancake cut into a predetermined width can be obtained.

3 Effects

In the magnetic recording medium of an embodiment of the present technology, the magnetic layer 13 contains a cubic crystal ferrite magnetic powder, the sum of the squareness ratio in the longitudinal direction and the squareness ratio in the vertical direction is 1.2 or more, and the difference of the squareness ratio in the longitudinal direction and the squareness ratio in the vertical direction is 0.15 or more. By this way, a magnetic recording medium having a high SNR and being capable of short wavelength recording can be obtained.

In the method for producing the magnetic recording medium of an embodiment of the present technology, a cubic crystal ferrite magnetic powder is used as a magnetic powder, and the cubic crystal ferrite magnetic powder is subjected to electric field orientation in the longitudinal orientation of the substrate body 11 in the step for applying and drying the coating for forming a magnetic layer. By this way, the sum of the squareness ratio in the longitudinal direction and the squareness ratio in the vertical direction can be 1.2 or more, and the difference of the squareness ratio in the longitudinal direction and the squareness ratio in the vertical direction can be 0.15 or more.

EXAMPLES

The present technology technique will be specifically explained by Examples and Reference Examples, but the present technology is not limited to only these Examples and Reference Examples.

These Examples and Reference Examples will be explained in the following order.

i Relationship between dispersion time and squareness ratio of coating for forming magnetic layer ii Relationship between sum and difference of squareness ratios in longitudinal direction and vertical direction, and SNR <i Relationship Between Dispersion Time and Squareness Ratio of Coating for Forming Magnetic Layer>

Reference Examples 1-1 to 1-9

Firstly, a first composition having the following formulation was kneaded in an extruder. Secondly, the first composition and a second composition having the following formulation were added to a stirring tank equipped with a disper, and pre-mixing was conducted. Subsequently, sand mill mixing was further conducted, and a filter treatment was conducted to give a mixture. Then, the above-mentioned mixture was subjected to a dispersion treatment (only a pre-dispersion treatment) by a bead mill disperser (first disperser) of a circulation operation system using zirconia beads of 0.3 mmφ in diameter. Note that the time for the dispersion treatment by the first disperser was changed within the range of 1 to 9 hours for every sample, whereby the dispersion state of the coating was changed for every sample. By the above-mentioned way, a coating for forming a magnetic layer was prepared.
(First Composition)
CoNiMnZn Ferrite Crystalline Magnetic Powder: 100 Parts by Mass
(particle shape: approximately cubic shape, average particle size (average plate diameter): 21 nm, average aspect ratio (average plate shape ratio (average plate diameter/average plate thickness)): 1 (=21 nm/21 nm)
Vinyl chloride-based resin (cyclohexanone solution: 30% by mass): 55.6 parts by mass
(polymerization degree 300, Mn=10,000, containing $OSO_3K$=0.07 mmol/g, secondary OH=0.3 mmol/g as polar groups)
Aluminum oxide powder: 5 parts by mass
($\alpha$-$Al_2O_3$, average particle size: 0.2 μm)
Carbon black: 2 parts by mass
(manufactured by Tokai Carbon Co. Ltd., trade name: SEAST TA)

(Second Composition)
Vinyl chloride-based resin: 27.8 parts by mass
(resin solution: resin content: 30% by mass, cyclohexanone: 70% by mass)
n-butyl stearate: 2 parts by mass
Methyl ethyl ketone: 121.3 parts by mass
Toluene: 121.3 parts by mass
Cyclohexanone: 60.7 parts by mass Then, a third composition having the following formulation was kneaded in an extruder. Subsequently, the third composition and a fourth composition having the following formulation were added to a stirring tank equipped with a disper, and pre-mixing was conducted. Subsequently, sand mill mixing was further conducted, and a filter treatment was conducted to prepare a coating for forming a primer layer.
(Third Composition)
Needle shape iron oxide powder: 100 parts by mass
($\alpha$-$Fe_2O_3$, average longitudinal axis length: 0.15 μm)
Vinyl chloride-based resin: 55.6 parts by mass
(resin solution: resin content: 30% by mass, cyclohexanone: 70% by mass)
Carbon black: 10 parts by mass
(average particle size: 20 nm)
(Fourth Composition)
Polyurethane-based resin UR8200 (manufactured by Toyobo Co., Ltd.): 18.5 parts by mass
n-butyl stearate: 2 parts by mass
Methyl ethyl ketone: 108.2 parts by mass
Toluene: 108.2 parts by mass
Cyclohexanone: 18.5 parts by mass Then, 4 parts by mass of a polyisocyanate (trade name: Coronate L, manufactured by Nippon Polyurethane Industry Co., Ltd.) was added as a hardener and 2 parts by mass of myristic acid was added to each of the coating for forming a magnetic layer and the coating for forming a primer layer prepared as above.

Then, a primer layer and a magnetic layer are formed by using these coatings on a polyethylene naphthalate film (PEN film), which is a substrate body, as follows. Firstly, the coating for forming a primer layer was applied and dried on a PEN film having a thickness of 6.2 μm to form a primer layer on the PEN film. Secondly, the coating for forming a magnetic layer was applied and dried on the primer layer to form a magnetic layer on the primer layer. Note that during the drying, a CoNiMnZn ferrite crystalline magnetic powder was subjected to electric field orientation by a solenoid coil in the longitudinal direction of the PEN film. Then, the PEN film on which the primer layer and the magnetic layer have been formed was subjected to calender processing by metal rolls, whereby the surface of the magnetic layer surface was smoothened.

Then, as a back coat layer, a coating having the following composition was applied at a film thickness of 0.6 μm on the surface opposite to the magnetic layer of the PEN film, and a drying treatment was conducted.
Carbon black (trade name: #80, manufactured by Asahi Carbon Co., Ltd.): 100 parts by mass
Polyester polyurethane: 100 parts by mass
(trade name: N-2304, manufactured by Nippon Polyurethane Industry Co., Ltd.)
Methyl ethyl ketone: 500 parts by mass
Toluene: 400 parts by mass
Cyclohexanone: 100 parts by mass Then, the PEN film on which the primer layer, the magnetic layer and the back coat layer had been formed as above was cut into a width of one-half inch (12.65 mm) to give a magnetic tape.

Reference Examples 1-10 to 1-17

Firstly, the first composition was kneaded in an extruder. Secondly, the first composition and the second composition were added to a stirring tank equipped with a disper, and pre-mixing was conducted. Note that as the first and second compositions, those having similar formulations to those in Reference Example 1-1 were used. Subsequently, sand mill mixing was further conducted, and a filter treatment was conducted to give a mixture. Then, the above-mentioned mixture was subjected to a pre-dispersion treatment for 9 hours in a bead mill disperser having a circulation operation system using zirconia beads of 3 mmφ in diameter (a first disperser). Then, the mixture that had been subjected to the above-mentioned dispersion treatment was further subjected to a final dispersion treatment by a bead mill disperser of a circulation operation system using zirconia beads of 0.1 mmφ in diameter (a second disperser). Note that the time for the final dispersion treatment by the second disperser was changed in the range of 1 to 8 hours in each sample, so that the dispersion state of the coating was different in every sample. The coating for forming a magnetic layer was prepared as above.

Magnetic tapes were obtained in a similar manner to that of Reference Example 1-1, except for the above-mentioned step for preparing a coating for forming a magnetic layer.

Reference Examples 2-1 to 2-9

Magnetic tapes were obtained in similar manners to that of Reference Examples 1-1 to 1-9, except that the CoNiMnZn ferrite crystalline magnetic powder was used in an unoriented state without subjecting to electric field orientation in the longitudinal direction of the PEN film in the step for forming the magnetic layer.

Reference Examples 2-10 to 2-17

Magnetic tapes were obtained in similar manners to that of Reference Examples 1-10 to 1-17, except that the CoNiMnZn ferrite crystalline magnetic powder was used in an unoriented state without subjecting to electric field orientation in the longitudinal direction of the PEN film in the step for forming the magnetic layer.

[Evaluation]

The magnetic tapes obtained as above were evaluated as mentioned below.
(Squareness Ratio)

Using an oscillation sample flux meter (manufactured by Lakeshore), a magnetization curve of the magnetic tape in the longitudinal direction was measured at an environmental temperature of 23 to 25° C. and an applied electric field of 15 kOe, and a squareness ratio Rs in the longitudinal direction (=Mr (residual magnetization in non-magnetic field)/Ms (magnetization at 15 kOe)) of the magnetic tape was obtained. At this time, the magnetization amount in a base film single body was measured, and the magnetization amount thereof was subtracted from the magnetization amount of the magnetic tape to calibrate the background.

Figure 2:
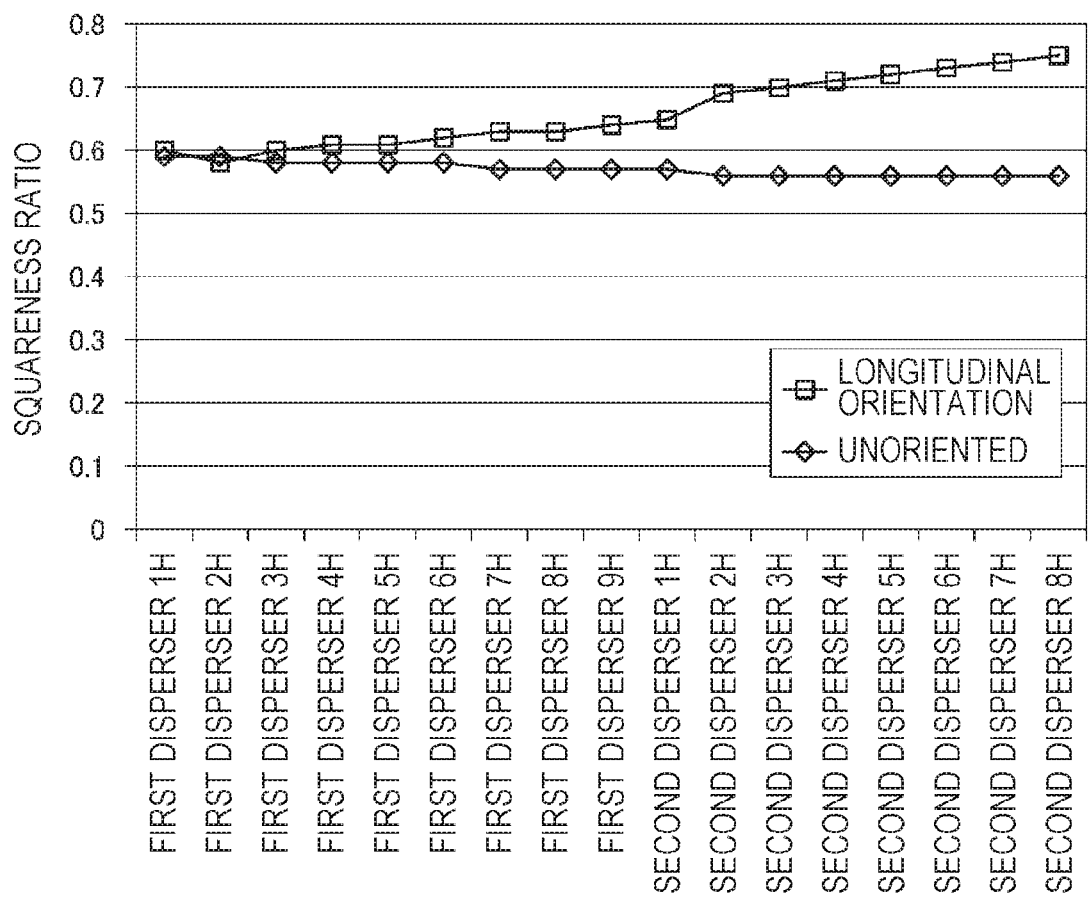
FIG. 2 is a graph showing the relationship between the dispersion time and the squareness ratio.

FIG. 2 shows the relationship between the dispersion time and the squareness ratio. The following matters are understood from FIG. 2. In the magnetic tapes in which a Co-based spinel ferrimagnetic powder (cubic crystal ferrite magnetic powder) had been subjected to electric field orientation (Reference Examples 1-1 to 1-17), the squareness ratio in the longitudinal direction of the magnetic tape tends to increase in accordance with the increases in the dispersion times of the first disperser and the second disperser. The reason therefor is that particles of a certain number that are present as a mass are loosened by increasing the dispersion times, and the magnetization easy axis of each particle is easily directed to the magnetic field direction. On the other hand, in the magnetic tapes in which the Co-based spinel ferrimagnetic powder is unoriented (Reference Examples 2-1 to 2-17), the squareness ratio in the longitudinal direction of the magnetic tape tends to be approximately constant irrespective of the increase in the dispersion times of the first disperser and the second disperser.

<ii Relationship Between Sum and Difference of Squareness Ratios in Longitudinal Direction and Vertical Direction, and SNR>

Examples 1 to 5

Firstly, a first composition having the following formulation was kneaded in an extruder. Subsequently, the first composition and a second composition having the following formulation were added to a stirring tank equipped with a disper, and pre-mixing was conducted. Subsequently, sand mill mixing was further conducted, and a filter treatment was conducted to give a mixture. Secondly, the above-mentioned mixture was subjected to a pre-dispersion treatment for 9 hours in a bead mill disperser having a circulation operation system using zirconia beads of 3 mmφ in diameter (a first disperser). Then, the mixture that had been subjected to the above-mentioned dispersion treatment was further subjected to a final dispersion treatment by a bead mill disperser of a circulation operation system using zirconia beads of 0.1 mmφ in diameter (a second disperser). Note that as shown in Table 1, the time of the final dispersion treatment by the second disperser was preset for every sample to adjust the dispersion state of the coating. By the above-mentioned way, a coating for forming a magnetic layer was prepared.
(First Composition)
CoNiMnZn ferrite crystalline magnetic powder: 100 parts by mass
(particle shape: approximately cubic shape, average particle size (average plate diameter): 20 to 30 nm, average aspect ratio (average plate shape ratio (average plate diameter/average plate thickness)): 1.0 to 1.2)
Vinyl chloride-based resin (cyclohexanone solution: 30% by mass): 55.6 parts by mass
(polymerization degree 300, Mn=10,000, containing $OSO_3K$=0.07 mmol/g, secondary OH=0.3 mmol/g as polar groups)
Aluminum oxide powder: 5 parts by mass
($\alpha$-$Al_2O_3$, average particle size: 0.2 μm)
Carbon black: 2 parts by mass
(Trade name: SEAST TA, manufactured by Tokai Carbon Co., Ltd.)
(Second Composition)
Vinyl chloride-based resin: 27.8 parts by mass
(resin solution: resin content: 30% by mass, cyclohexanone: 70% by mass)
n-butyl stearate: 2 parts by mass
Methyl ethyl ketone: 121.3 parts by mass
Toluene: 121.3 parts by mass
Cyclohexanone: 60.7 parts by mass Then, a third composition having the following formulation was kneaded in an extruder. Subsequently, the third composition and a fourth composition having the following formulation were added to a stirring tank equipped with a disper, and pre-mixing was conducted. Subsequently, sand mill mixing was further conducted, and a filter treatment was conducted to prepare a coating for forming a primer layer.
(Third Composition)
Needle shape iron oxide powder: 100 parts by mass ($\alpha$-$Fe_2O_3$, average longitudinal axis length: 0.15 μm)
Vinyl chloride-based resin: 55.6 parts by mass
(resin solution: resin content: 30% by mass, cyclohexanone: 70% by mass)
Carbon black: 10 parts by mass
(average particle size: 20 nm)
(Fourth Composition)
Polyurethane-based resin UR8200 (manufactured by Toyobo Co., Ltd.): 18.5 parts by mass
n-butyl stearate: 2 parts by mass
Methyl ethyl ketone: 108.2 parts by mass
Toluene: 108.2 parts by mass
Cyclohexanone: 18.5 parts by mass Then, four parts by mass of a polyisocyanate (trade name: Coronate L, manufactured by Nippon Polyurethane Industry Co., Ltd.) was added as a hardener and 2 parts by mass of myristic acid was added to each of the coating for forming a magnetic layer and the coating for forming a primer layer prepared as above.

Then, a primer layer and a magnetic layer are formed by using these coatings on a PEN film, which is a substrate body, as follows. Firstly, the coating for forming a primer layer was applied and dried on a PEN film having a thickness of 6.2 μm to form a primer layer on the PEN film. Secondly, the coating for forming a magnetic layer was applied and dried on the primer layer to form a magnetic layer on the primer layer. Note that during the drying, a CoNiMnZn ferrite crystalline magnetic powder was subjected to electric field orientation by a solenoid coil in the longitudinal direction of the PEN film. At this time, the intensity of the electric field was preset for every sample as shown in Table 1. Then, the PEN film on which the primer layer and the magnetic layer had been formed was subjected to calender processing by a metal roll, where by the surface of the magnetic layer was smoothened.

Then, as a back coat layer, a coating having the following composition was applied at a film thickness of 0.6 μm on the surface opposite to the magnetic layer of the PEN film, and a drying treatment was conducted.
Carbon black (trade name: #80, manufactured by Asahi Carbon Co., Ltd.): 100 parts by mass
Polyester polyurethane: 100 parts by mass
(trade name: N-2304, manufactured by Nippon Polyurethane Industry Co., Ltd.)
Methyl ethyl ketone: 500 parts by mass
Toluene: 400 parts by mass
Cyclohexanone: 100 parts by mass Then, the PEN film on which the primer layer, the magnetic layer and the back coat layer had been formed as above was cut into a width of one-half inch (12.65 mm) to give a magnetic tape.

Examples 6 to 9

In the step of preparing the first composition, a CoNiMn ferrite crystalline magnetic powder (particle shape: approximately cubic shape, average particle size (average plate diameter): 20 to 30 nm, average aspect ratio (average plate shape ratio): 1 to 1.2) was used instead of the CoNiMnZn ferrite crystalline magnetic powder. Furthermore, the dispersion time for the second disperser was preset as shown in Table 1 for every sample to adjust the dispersion state of the coating. Furthermore, in the step of forming the magnetic layer, as shown in Table 1, the intensity of the electric field was preset for every sample. The other matters were conducted in similar manners to those in Example 1 to give a magnetic tape.

Comparative Examples 1 and 2

The CoNiMnZn ferrite crystalline magnetic powder was used in an unoriented state without subjecting to electric field orientation in the longitudinal direction of the PEN film in the step for forming the magnetic layer. Furthermore, the dispersion time for the second disperser was preset as shown in Table 1 for every sample to adjust the dispersion state of the coating. The other matters were conducted in similar manners to those in Example 1 to give a magnetic tape.

Comparative Examples 3 and 4

The CoNiMn ferrite crystalline magnetic powder was used in an unoriented state without subjecting to electric field orientation in the longitudinal direction of the PEN film in the step for forming the magnetic layer. Furthermore, the dispersion time for the second disperser was preset as shown in Table 1 for every sample to adjust the dispersion state of the coating. The other matters were conducted in similar manners to those in Example 6 to give a magnetic tape.

Comparative Example 5

In the step for preparing the first composition, a FeCo alloy-based metal magnetic powder having a needle shape was used instead of the CoNiMnZn ferrite magnetic powder. Furthermore, in the step of forming the magnetic layer, the FeCo alloy-based metal magnetic powder was subjected to electric field orientation at 10 kOe in the longitudinal direction of the PEN film. The other matters were conducted in similar manners to those in Example 1 to give a magnetic tape.

Comparative Example 6

In the step of preparing the first composition, a barium ferrite magnetic powder having a hexagonal plate shape was used instead of the CoNiMnZn ferrite magnetic powder. Furthermore, in the step of forming the magnetic layer, the barium ferrite magnetic powder was naturally and slightly oriented in the thickness direction of the PEN film without applying an electric field. The other matters were conducted in similar manners to those in Example 1 to give a magnetic tape.

Figure 3:
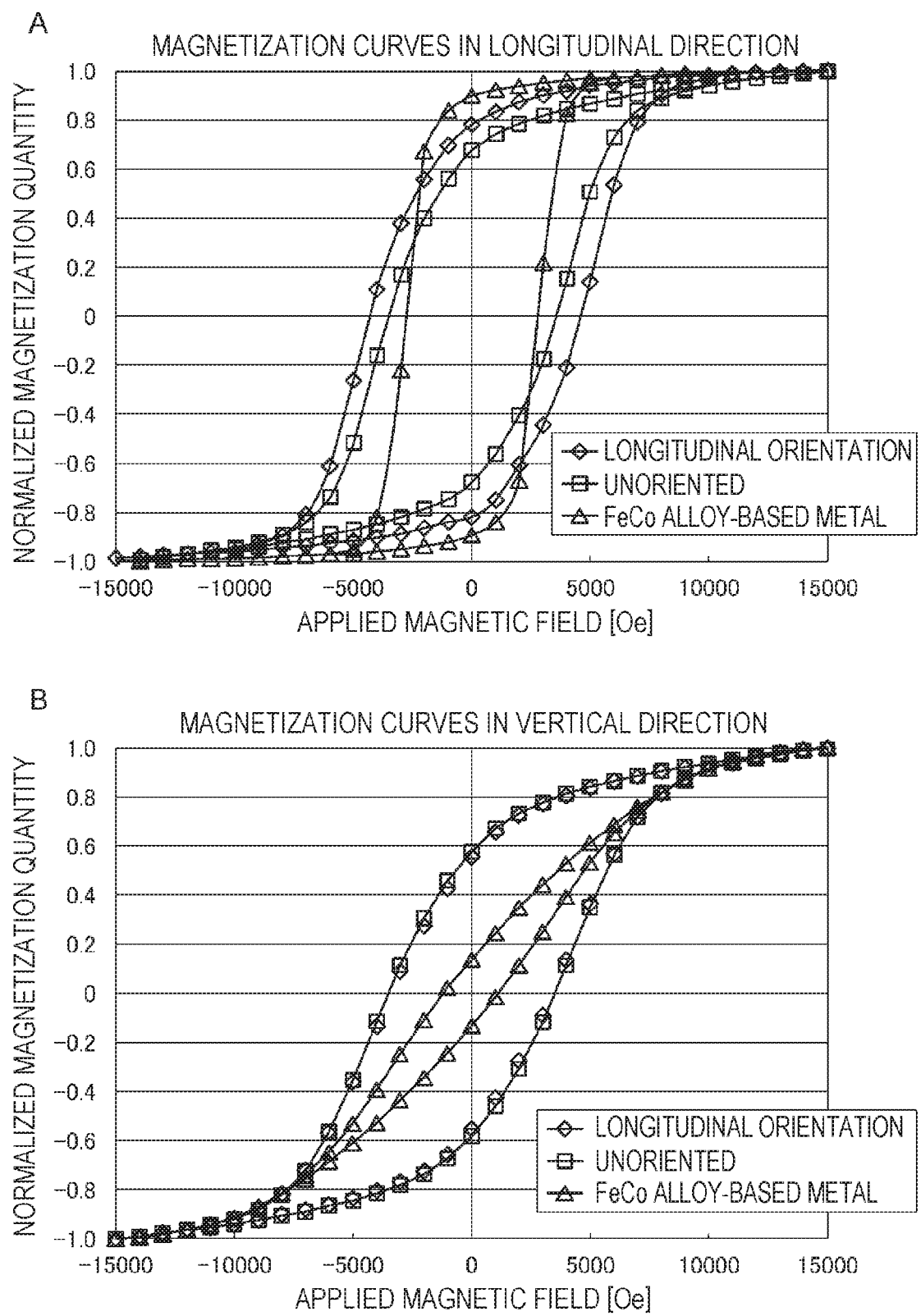
FIG. 3A is a graph showing the magnetization curves in the longitudinal direction of the magnetic tapes of Example 1, Comparative Example 1 and Comparative Example 5.
FIG. 3B is a graph showing the magnetization curves in the vertical direction of the magnetic tapes of Example 1, Comparative Example 1 and Comparative Example 5.

[Evaluation]
The magnetic tapes obtained as above were evaluated as follows.
(Magnetic Property)
Using an oscillation sample flux meter (manufactured by Lakeshore), a magnetization curve of the magnetic tape in the longitudinal direction and a magnetization curve in the vertical direction to the surface of the magnetic tape were measured at an environmental temperature of 23 to 25° C. and an applied electric field of 15 kOe, and squareness ratios Rs in the longitudinal direction and the vertical direction (=Mr (the residual magnetization in a non-magnetic field)/Ms (magnetization at 15 kOe)) and a coercive force Hc in the vertical direction were obtained. At this time, the magnetization amount in a base film single body was measured, and the magnetization amount thereof was subtracted from the magnetization amount of the magnetic tape to calibrate the background. Then, from the obtained squareness ratios in the longitudinal direction and the vertical direction, "the sum of the squareness ratio in the longitudinal direction and the squareness ratio in the vertical direction" and "the difference of the squareness ratio in the longitudinal direction and the squareness ratio in the vertical direction" were obtained as evaluation indices for the magnetic tape. FIG. 3A shows the magnetization curves in the longitudinal direction of the magnetic tapes of Example 1, Comparative Example 1 and Comparative Example 5. FIG. 3B shows the magnetization curves in the vertical direction of the magnetic tapes of Example 1, Comparative Example 1 and Comparative Example 5.

(SNR)

Figure 4:
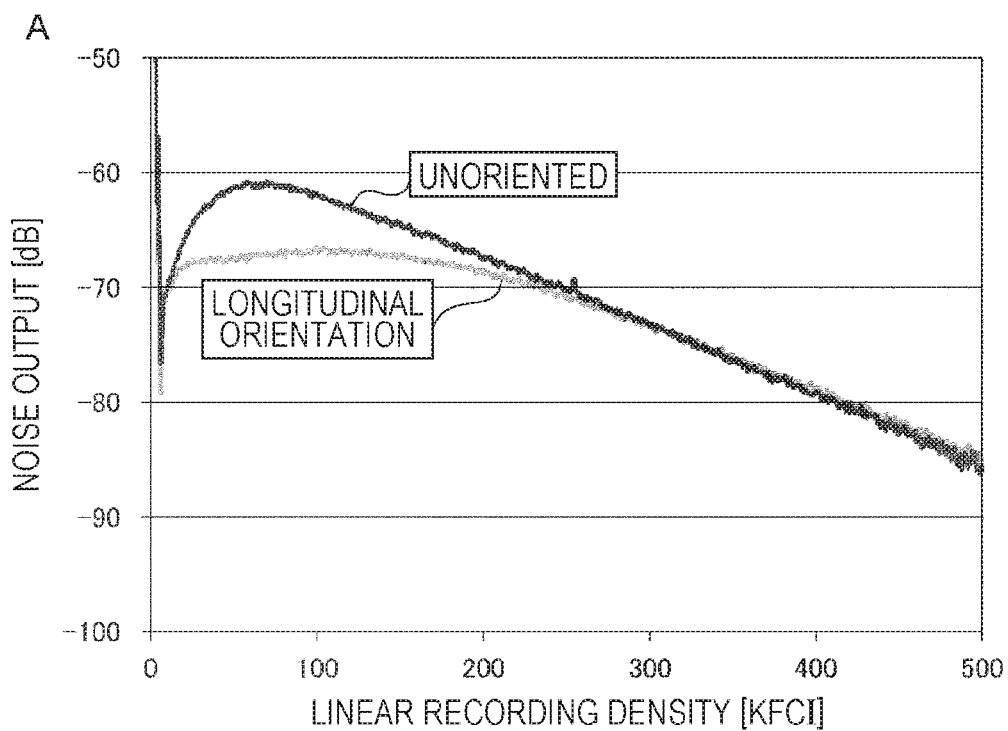
FIG. 4A is a graph showing the direct current erasing noises of the magnetic tapes of Example 1 and Comparative Example 1.
FIG. 4B is a graph showing the frequency wave number properties of the magnetic tapes of Example 1 and Comparative Example 1.
Figure 4:
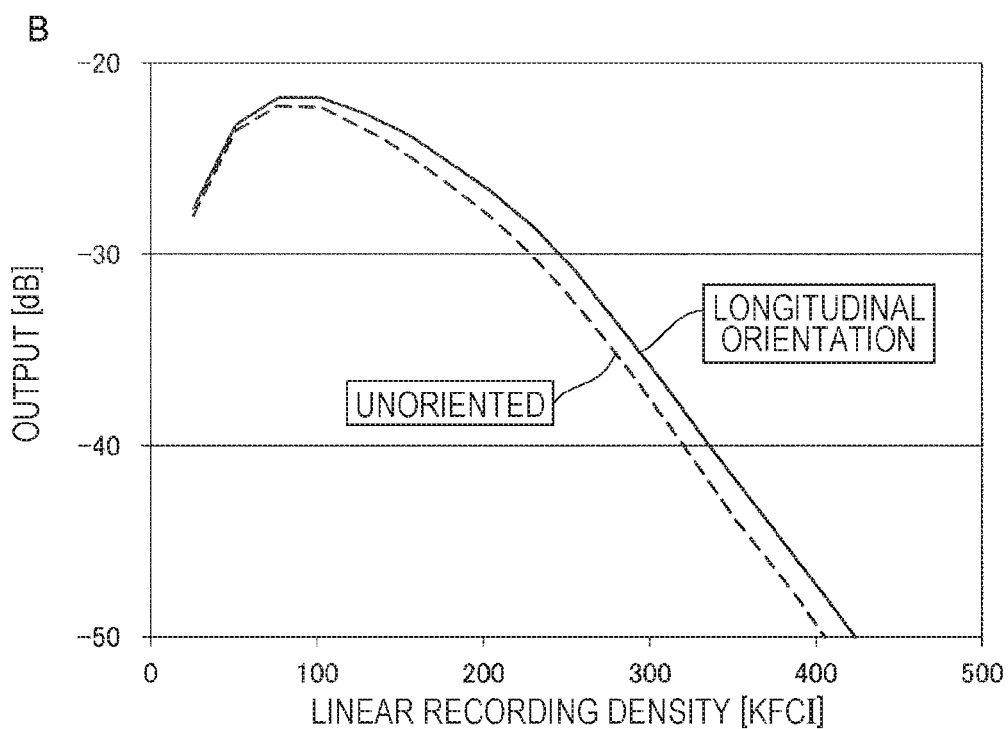

Firstly, the magnetic tape was travelled by a commercially available LFF manufactured by Mountain Engineering, and recording and replay were conducted by using a head for a linear tape drive to thereby obtain a DC erasure noise and an SNR. Note that the recording wavelength was 280 kFCI (kilo Flux Changes per Inch). The DC erasure noise was measured by a spectrum analyzer, and the direct-current erasing was conducted by applying an electric field to the tape with a commercially available neodymium magnet. Note that the DC erasure noise means a noise that occurs in a case where a magnetic tape that has undergone direct-current erasing (degaussing) is replayed. FIG. 4A shows the direct current erasing noises of the magnetic tapes of Example 1 and Comparative Example 1. FIG. 4B shows the frequency wave number properties of the magnetic tapes of Example 1 and Comparative Example 1.

Secondly, the DC erasure noise obtained by integration up to a linear recording density of 500 kFCI was evaluated according to the following criteria.
A: The DC erasure noise is 0.0012 mVrms or less.
B: The DC erasure noise is more than 0.0012 mVrms and 0.0015 mVrms or less.
C: The DC erasure noise is more than 0.0015 mVrms.

However, in the evaluation of the SNR, the above-mentioned symbols "A", "B" and "C" respectively mean that "the noise is very low", "the noise is low" and "the noise is high" as evaluation results. In order to obtain an SNR that is at least necessary for establishing a recording-replay system, it is necessary that the DC erasure noise is set to at least 0.0015 mVrms or less. Therefore, 0.0015 mVrms was deemed to be a judgment criterion for a low DC erasure noise.

Then, the obtained SNR was evaluated according to the following criteria.
A: The SNR is 17 dB or more.
B: The SNR is 15 dB or more and lower than 17 dB.
C: The SNR is lower than 15 dB.

However, in the evaluation of the SNR, the above-mentioned symbols "A", "B" and "C" respectively mean that "the SNR is very fine", "the SNR is fine" and "the SNR is poor" as evaluation results. Since it is said that an SNR that is at least necessary for establishing a recording-replay system is generally about 15 dB, 15 dB was deemed to be a judgment criterion for a fine SNR.

Table 1 shows the evaluation results of the magnetic tapes of Examples 1 to 9 and Comparative Examples 1 to 6.

TABLE 1

| | Magnetic powder | | Orientation (longitudinal direction) | Dispersion time [h] | Longitudinal orientation magnetic field [kOe] | Vertical Rs | Longitudinal Rs |
|---|---|---|---|---|---|---|---|
| | Material | Particle shape | | | | | |
| Example 1 | CoNiMnZn ferrite | Approximately cubic shape | Present | 8 | 10 | 0.49 | 0.79 |
| Example 2 | CoNiMnZn ferrite | Approximately cubic shape | Present | 7 | 10 | 0.51 | 0.77 |
| Example 3 | CoNiMnZn ferrite | Approximately cubic shape | Present | 6 | 10 | 0.52 | 0.75 |
| Example 4 | CoNiMnZn ferrite | Approximately cubic shape | Present | 8 | 5 | 0.52 | 0.75 |
| Example 5 | CoNiMnZn ferrite | Approximately cubic shape | Present | 7 | 5 | 0.53 | 0.73 |
| Example 6 | CoNiMn ferrite | Approximately cubic shape | Present | 8 | 10 | 0.5 | 0.78 |
| Example 7 | CoNiMn ferrite | Approximately cubic shape | Present | 7 | 10 | 0.52 | 0.76 |
| Example 8 | CoNiMn ferrite | Approximately cubic shape | Present | 6 | 10 | 0.54 | 0.73 |
| Example 9 | CoNiMn ferrite | Approximately cubic shape | Present | 8 | 5 | 0.54 | 0.73 |
| Comparative Example 1 | CoNiMnZn ferrite | Approximately cubic shape | Absent | 7 | | 0.58 | 0.68 |
| Comparative Example 2 | CoNiMnZn ferrite | Approximately cubic shape | Absent | 6 | | 0.58 | 0.67 |
| Comparative Example 3 | CoNiMn ferrite | Approximately cubic shape | Absent | 7 | | 0.58 | 0.68 |
| Comparative Example 4 | CoNiMn ferrite | Approximately cubic shape | Absent | 6 | | 0.58 | 0.67 |
| Comparative Example 5 | FeCo alloy-based metal | Needle shape | Present | 7 | 10 | 0.14 | 0.88 |
| Comparative Example 6 | Barium ferrite | Hexagonal plate shape | Absent | 7 | | 0.54 | 0.38 |

TABLE 1-continued

|  | Longitudinal Rs + Vertical Rs | Longitudinal Rs − Vertical Rs | Vertical Hc [kA/m] | Evaluation | |
|---|---|---|---|---|---|
|  |  |  |  | DC erase Noise [mVrms] | SNR (280 kFCI) [dB] |
| Example 1 | 1.28 | 0.3 | 328 | A | A |
| Example 2 | 1.28 | 0.26 | 329 | A | A |
| Example 3 | 1.27 | 0.23 | 330 | B | B |
| Example 4 | 1.27 | 0.23 | 330 | B | B |
| Example 5 | 1.26 | 0.2 | 320 | B | B |
| Example 6 | 1.28 | 0.28 | 335 | A | A |
| Example 7 | 1.28 | 0.24 | 328 | B | B |
| Example 8 | 1.27 | 0.19 | 329 | B | B |
| Example 9 | 1.27 | 0.19 | 320 | B | B |
| Comparative Example 1 | 1.26 | 0.1 | 278 | C | C |
| Comparative Example 2 | 1.25 | 0.09 | 279 | C | C |
| Comparative Example 3 | 1.26 | 0.1 | 278 | C | C |
| Comparative Example 4 | 1.25 | 0.09 | 280 | C | C |
| Comparative Example 5 | 1.02 | 0.74 | 203 | C | C |
| Comparative Example 6 | 0.92 | −0.16 | 223 | C | C |

Rs: squareness ratio
Hc: coercive force

The following matters are understood from Table 1. In the magnetic tapes where a Co-based spinel ferrimagnetic powder (a cubic crystal ferrite magnetic powder) has been subjected to electric field orientation in the longitudinal direction of each magnetic tape (Examples 1 to 9), the sum of the squareness ratio in the longitudinal direction and the squareness ratio in the vertical direction is 1.2 or more, and the difference of the squareness ratio in the longitudinal direction and the squareness ratio in the vertical direction is 0.15 or more. On the other hand, in the magnetic tapes using a Co-based spinel ferrimagnetic powder in an unoriented state (Comparative Examples 1 to 4), the difference of the squareness ratio in the longitudinal direction and the squareness ratio in the vertical direction is not 0.15 or more. Furthermore, in the magnetic tape using a FeCo alloy-based metal magnetic powder (Comparative Example 5), the sum of the squareness ratio in the longitudinal direction and the squareness ratio in the vertical direction is not 1.2 or more. Furthermore, in the magnetic tape using a barium ferrite magnetic powder (Comparative Example 6), the difference of the squareness ratio in the longitudinal direction and the squareness ratio in the vertical direction is not 0.15 or more, and the sum of the squareness ratio in the longitudinal direction and the squareness ratio in the vertical direction is not 1.2 or more.

In the magnetic tapes in which the sum of the squareness ratio in the longitudinal direction and the squareness ratio in the vertical direction is 1.2 or more, and the difference of the squareness ratio in the longitudinal direction and the squareness ratio in the vertical direction is 0.15 or more (Examples 1 to 9), the direct current erasing noise is low, and a fine SNR can be obtained. On the other hand, in the magnetic tapes in which the difference of the squareness ratio in the longitudinal direction and the squareness ratio in the vertical direction is not 0.15 or more (Comparative Examples 1 to 4), the direct current erasing noise is high, and a fine SNR is not obtained. Furthermore, also in the magnetic tape in which the sum of the squareness ratio in the longitudinal direction and the squareness ratio in the vertical direction is 1.2 or more (Comparative Example 5) and the magnetic tape in which the difference of the squareness ratio in the longitudinal direction and the squareness ratio in the vertical direction is not 0.15 or more, and the sum of the squareness ratio in the longitudinal direction and the squareness ratio in the vertical direction is not 1.2 or more (Comparative Example 6), the direct current erasing noise is high, and a fine SNR cannot be obtained.

In the magnetic tapes in which the sum of the squareness ratio in the longitudinal direction and the squareness ratio in the vertical direction is 1.28 or more, and the difference of the squareness ratio in the longitudinal direction and the squareness ratio in the vertical direction is 0.26 or more (Examples 1, 2 and 6), the direct current erasing noise is specifically low, and a very fine SNR can be obtained.

The following matters are understood from FIGS. 3A and 3B. It is understood that, by applying an electric field in the longitudinal direction of the long substrate body in the step for forming the magnetic layer, the residual magnetization that affects output can be varied. Note that it is also possible to adjust the residual magnetization by varying the intensity of the applied electric field.

The following matters are understood from FIGS. 4A and 4B. In the magnetic tape in which a Co-based spinel ferrimagnetic powder was subjected to electric field orientation in the longitudinal direction of the magnetic tape, a lower direct current erasing noise and a higher output than that of the magnetic tape in which the Co-based spinel ferrimagnetic powder is used in an unoriented state can be obtained. Therefore, a fine SNR can be obtained.

The embodiments and modified examples thereof and Examples of the present technology have been specifically explained above. However, the present technology is not limited to the above-mentioned embodiments and modified examples thereof and Examples, and various modifications based on the technical concept of the present technology are possible.

For example, the configurations, methods, steps, shapes, materials and numerical values and the like exemplified for the above-mentioned embodiments and modified examples thereof and Examples are merely exemplification, and where necessary, any different configurations, methods, steps, shapes, materials and numerical values and the like may be used.

Furthermore, the configurations, methods, steps, shapes, materials and numerical values and the like of the above-mentioned embodiments and modified examples thereof and Examples can be combined with one another as long as they do not deviate from the gist of the present technology.

Furthermore, the present technology can also adopt the following configurations.

(1) A magnetic recording medium including:
a long substrate body; and
a magnetic layer including a powder of cubic crystal ferrite magnetic particles,
in which a sum of a squareness ratio in a longitudinal direction and a squareness ratio in a vertical direction is 1.2 or more, and a difference of the squareness ratio in the longitudinal direction and the squareness ratio in the vertical direction is 0.15 or more.

(2) The magnetic recording medium according to (1), in which the cubic crystal ferrite magnetic particles contain Co.

(3) The magnetic recording medium according to (2), in which the cubic crystal ferrite magnetic particles further contain one or more kind selected from the group consisting of Ni, Mn, Al, Cu and Zn.

(4) The magnetic recording medium according to any of (1) to (3), in which the sum of the squareness ratio in the longitudinal direction and the squareness ratio in the vertical direction is 1.28 or more, and the difference of the squareness ratio in the longitudinal direction and the squareness ratio in the vertical direction is 0.26 or more.

(5) The magnetic recording medium according to any of (1) to (4), in which the powder of cubic crystal ferrite magnetic particles is oriented in the longitudinal direction.

(6) The magnetic recording medium according to any of (1) to (5), in which the cubic crystal ferrite magnetic particles each have a cubic shape or an approximately cubic shape.

(7) The magnetic recording medium according to any of (1) to (6), in which the magnetic layer is a vertical recording layer.

REFERENCE SIGNS LIST

11 Substrate body
12 Primer layer
13 Magnetic layer

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A magnetic recording medium comprising:
a long substrate body; and
a magnetic layer including a powder of cubic crystal ferrite magnetic particles including one or more of CoNiMnZn ferrite and CoNiMn ferrite,
wherein the powder of cubic crystal ferrite magnetic particles is oriented in the longitudinal direction, and
wherein a sum of a squareness ratio in the longitudinal direction and a squareness ratio in a vertical direction is 1.2 or more, and a difference of the squareness ratio in the longitudinal direction and the squareness ratio in the vertical direction is 0.15 or more.

2. The magnetic recording medium according to claim 1, wherein the sum of the squareness ratio in the longitudinal direction and the squareness ratio in the vertical direction is 1.28 or more, and the difference of the squareness ratio in the longitudinal direction and the squareness ratio in the vertical direction is 0.26 or more.

3. The magnetic recording medium according to claim 1, wherein the cubic crystal ferrite magnetic particles each have a cubic shape or an approximately cubic shape.

4. The magnetic recording medium according to claim 1, wherein the magnetic layer is a vertical recording layer.

5. The magnetic recording medium according to claim 1, wherein the cubic crystal ferrite magnetic particles have an average particle size of 14 nm or less.

6. The magnetic recording medium according to claim 1, wherein the cubic crystal ferrite magnetic particles have an average particle size of 10 nm or more.

7. The magnetic recording medium according to claim 1, wherein the cubic crystal ferrite magnetic particles have an average aspect ratio of 0.75 or more.

8. The magnetic recording medium according to claim 1, wherein the cubic crystal ferrite magnetic particles have an average aspect ratio of 1.25 or less.

* * * * *